US010491258B1

(12) United States Patent
Liu

(10) Patent No.: US 10,491,258 B1
(45) Date of Patent: Nov. 26, 2019

(54) MULTIFUNCTIONAL MOBILE PHONE HOLDER

(71) Applicant: Topwell industrial (DongGuan) Co., Ltd, Dongguan (CN)

(72) Inventor: Qing Zhi Liu, Dongguan (CN)

(73) Assignee: Topwell industrial (DongGuan) Co., Ltd, Dongguan (CN)

( * ) Notice: Subject to any disclaimer, the term of this patent is extended or adjusted under 35 U.S.C. 154(b) by 0 days.

(21) Appl. No.: 16/248,797

(22) Filed: Jan. 16, 2019

(51) Int. Cl.
*H04B 1/3877* (2015.01)
*H04M 1/02* (2006.01)

(52) U.S. Cl.
CPC .......... *H04B 1/3877* (2013.01); *H04M 1/026* (2013.01)

(58) Field of Classification Search
CPC ............................. H04B 1/3877; H04M 1/026
See application file for complete search history.

(56) References Cited

U.S. PATENT DOCUMENTS

| D735,695 S | * | 8/2015 | Murphy | A45F 5/00 |
| | | | | D14/217 |
| 10,063,272 B1 | * | 8/2018 | Yeo | H04B 1/3888 |
| 2010/0222118 A1 | * | 9/2010 | Interdanato | H04B 1/385 |
| | | | | 455/575.6 |
| 2011/0034221 A1 | * | 2/2011 | Hung | A45C 11/00 |
| | | | | 455/575.8 |
| 2018/0241860 A1 | * | 8/2018 | Park | H04M 1/04 |

* cited by examiner

*Primary Examiner* — Marisol Figueroa

(57) ABSTRACT

A multifunctional mobile phone holder, comprising a bottom plate for fixing the back of mobile phone. One end of the bottom plate is provided with a sliding seat which can slide on bottom plate. There is a flexible belt between the other end of the bottom plate and the sliding seat. When the sliding seat is slid to one end of bottom plate, the flexible belt clings to the face of the bottom plate for integrated collection, and it is relatively thin. When the sliding seat slides to the middle of bottom plate, the flexible belt rises against the face of the bottom plate, forming a ring space for the finger to go through. The user's finger goes through the ring space, the flexible belt fastens the finger, so that the user can hold the phone firmly to avoid the phone dropping off.

9 Claims, 5 Drawing Sheets

MULTIFUNCTIONAL MOBILE PHONE HOLDER

BACKGROUND OF INVENTION

1. Field of the Invention

The present invention relates generally to the technical field of holder products, and more particularly to a multifunctional mobile phone holder.

2. Description of Related Art

With advance of science and technology and economic development, the occurrence of mobile phone has changed many people's life style and requirements for traditional means of communication, and people are no longer satisfied with the appearance and basic functions of mobile phone, besides calling and messaging, people seek for powerful operating systems or APPs of mobile phone to provide more stronger and more individualized social services.

Mobile phone has become a requisite tool in daily life. With the popularization of smart phone, more and more people use mobile phone to play games, see movies and read stories. In comparison to traditional mobile phone, the smart phone is portable and intelligent, its entertainment, business, newsletter and service application functions can satisfy consumers' experience in mobile internet better.

As the smart phone is large sized, it is hard to be held in hand tightly, especially when changing the posture, it may drop off by accident. In order to liberate both hands, a mobile phone holder is usually used to fix the smart phone, so that the smart phone stands on the table top like a notebook computer, and the user can enjoy modern life more comfortably and conveniently.

A ring mobile phone holder can solve the two problems simultaneously. To be specific, when the smart phone is held in hand, one finger goes through the ring in the ring mobile phone holder, so as to hold the smart phone firmly to avoid the smart phone dropping off. In addition, the ring can stand on the table top when it is unfolded, so as to support the smart phone on the table top.

As the ring is a hardware, it is relatively heavy and inaesthetic. Even if the edge of ring is designed as fillet, the hand is discomforted by scraping, and the ring is relatively hard, the finger is discomforted when going through it. In addition, the ring mobile phone holder is generally mounted in the middle of the back of smart phone, for some smart phones allowing wireless charging, the ring made of hardware will influence the wireless charging function.

In view of this, this inventor proposes the following technical proposal.

SUMMARY OF THE INVENTION

The purpose of the present invention is to overcome the deficiencies in the existing technology to provide a multifunctional mobile phone holder.

In order to solve the above problems, the technical scheme of the present invention is described below:

A multifunctional mobile phone holder, comprising:

a bottom plate (1) for fixing the back of mobile phone, features: one end of the bottom plate (1) is provided with a sliding seat (2) which can slide on bottom plate (1), there is a flexible belt (3) between the other end of the bottom plate (1) and sliding seat (2); when the sliding seat (2) slides to one end of bottom plate (1), the flexible belt (3) clings to the face of the bottom plate (1); when the sliding seat (2) slides to the middle of bottom plate (1), the flexible belt (3) rises against the face of the bottom plate (1), forming a ring space (10) for the finger to go through.

More particularly, a first slide rail (11) is formed on both sides of the bottom plate (1), a first slide slot (21) is located in the inner walls on both sides of the sliding seat (2), the first slide slot (21) is fitted over the first slide rail (11), so that the sliding seat (2) can be slideable on the bottom plate (1).

More particularly, a first stopping bulge (111) or a first stopping groove is located in the end and middle of the first slide rail (11); a second stopping groove (211) or a second stopping bulge adapted to the first stopping bulge (111) or the first stopping groove is located at the slot wall of the first slide slot (21) of the sliding seat (2).

More particularly, the surface of the sliding seat (2) is provided with several antislip grooves or antislip bulges (22).

More particularly, the flexible belt (3) is made of TPU soft gum, the sliding seat (2) is made of PC plastic, wherein the flexible belt (3) and sliding seat (2) are integrated by double injection.

More particularly, a bent portion (31) is formed at the other end of the flexible belt (3) opposite to sliding seat (2), the bent portion (31) is fastened to the back side of the other end of the bottom plate (1) by glue; wherein several positioning posts (12) are formed on the back side of the other end of the bottom plate (1), the positioning holes (311) in bent portion (31) are fitted over the positioning posts (12).

More particularly, the back side of the bottom plate (1) is provided with 3M strong adhesive (14).

More particularly, when the sliding seat (2) slides to the middle of bottom plate (1), the flexible belt (3) rises against the face of the bottom plate (1) as a support structure, and an on-board holder (4) is fitted over one end of the bottom plate (1), the on-board holder (4) has a locating detent (41) for fastening the automobile air conditioning outlet.

More particularly, the on-board holder (4) comprises a base (42), a cover plate (43) located at the bottom of the base (42), a rotating cap (44) installed on base (42) and the locating detent (41) which can rotate against the rotating cap (44) installed on rotating cap (44) by truss head screw (45); the base (42) is fitted over one end of the bottom plate (1), the face of the cover plate (43) contacts bottom plate (1).

More particularly, a first clamping portion (421) and a second clamping portion (422) are located on both sides of the bottom of the base (42), a stopper (423) is formed at one end of the bottom of the base (42); the first clamping portion (421) and the second clamping portion (422) clamp both sides of one end of the bottom plate (1) respectively, and the stopper (423) contacts one end of the bottom plate (1).

In comparison to the existing technology, the present invention has the following benefits:

1. In the use of the present invention, the bottom plate is fixed to the back of mobile phone. When the holder function is not required, the sliding seat is slid to one end of bottom plate, the flexible belt adheres to the face of the bottom plate for integrated collection, and it is relatively thin, the use of phone will not be influenced, and the product esthetics is guaranteed.

When the holder function is to be used, and the sliding seat is slid to the middle of bottom plate, the flexible belt rises against the face of the bottom plate, forming a ring space for the finger to go through. The user's finger goes through the ring space, and the flexible belt fastens the finger, so that the user can hold the mobile phone tightly to avoid the phone dropping off, and the flexible belt is relatively soft, it will not scratch the finger, and it is comfortable for the finger. The raised flexible belt stands on the table top, so as to support the mobile phone on the table top. In addition, all of the parts in the present invention are nonmetal, the wireless charging function of mobile phone will not be influenced, the use is more convenient, the marketability is stronger.

2. The present invention is used together with on-board holder, when the on-board holder is fastened to the automobile air conditioning outlet, the raised flexible belt contacts the side edge of automobile air conditioning outlet, so that the flexible belt behaves as an auxiliary support, the present invention is stabilized at the automobile air conditioning outlet, it is very convenient to use.

DETAILED DESCRIPTION OF THE INVENTION

The present invention is further described below with attached figures.

Figure 1:
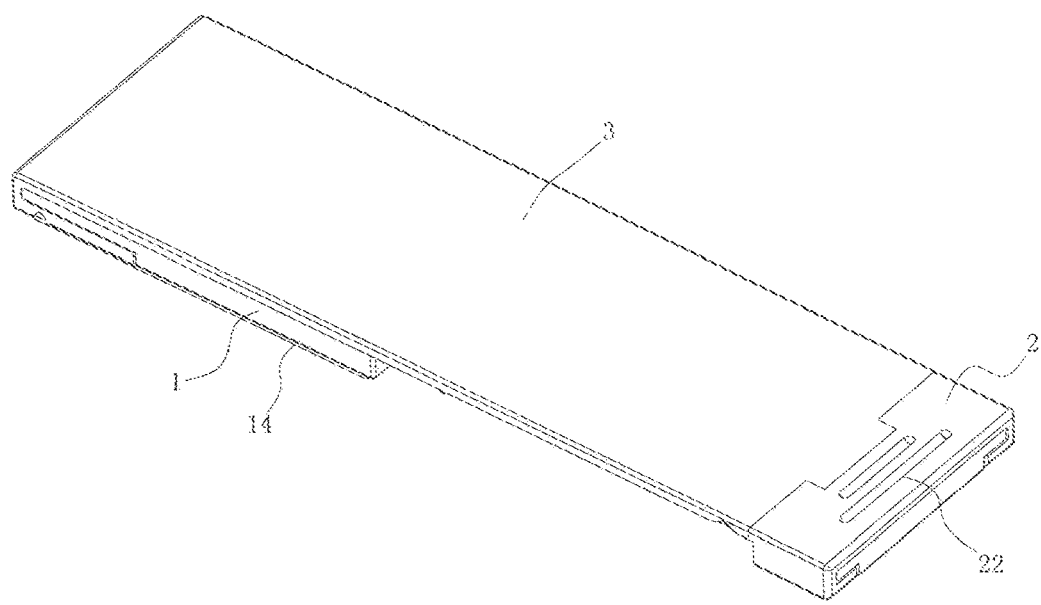
FIG. 1 is a stereogram of the present invention.
Figure 2:
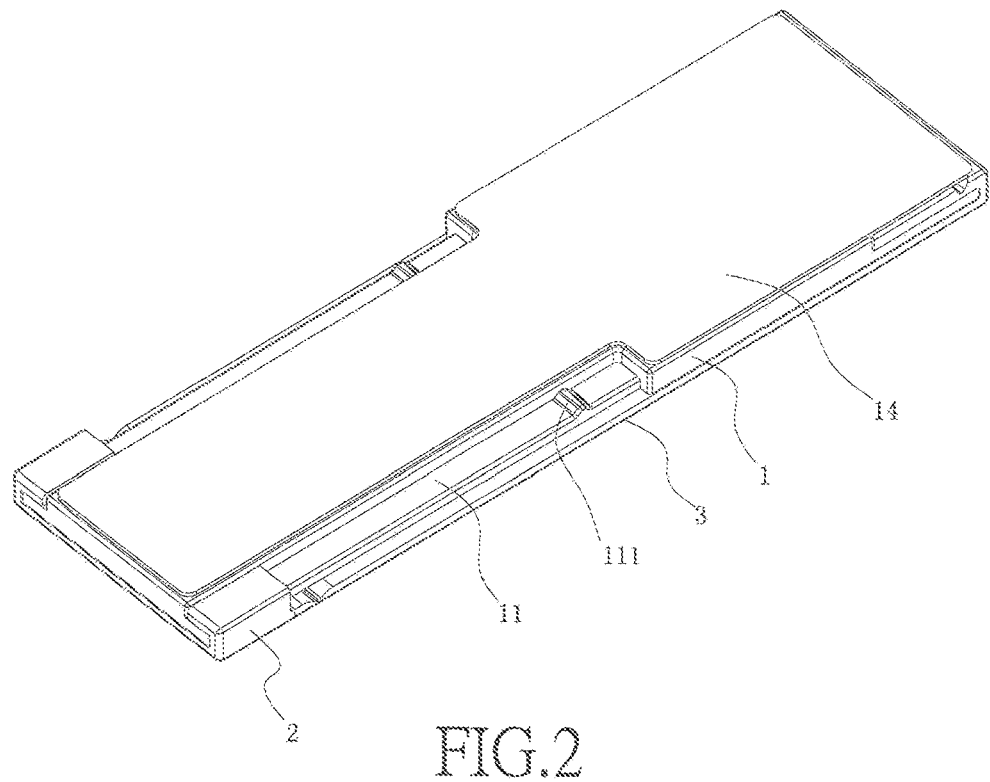
FIG. 2 is a stereogram of the present invention from another viewing angle.
Figure 3:
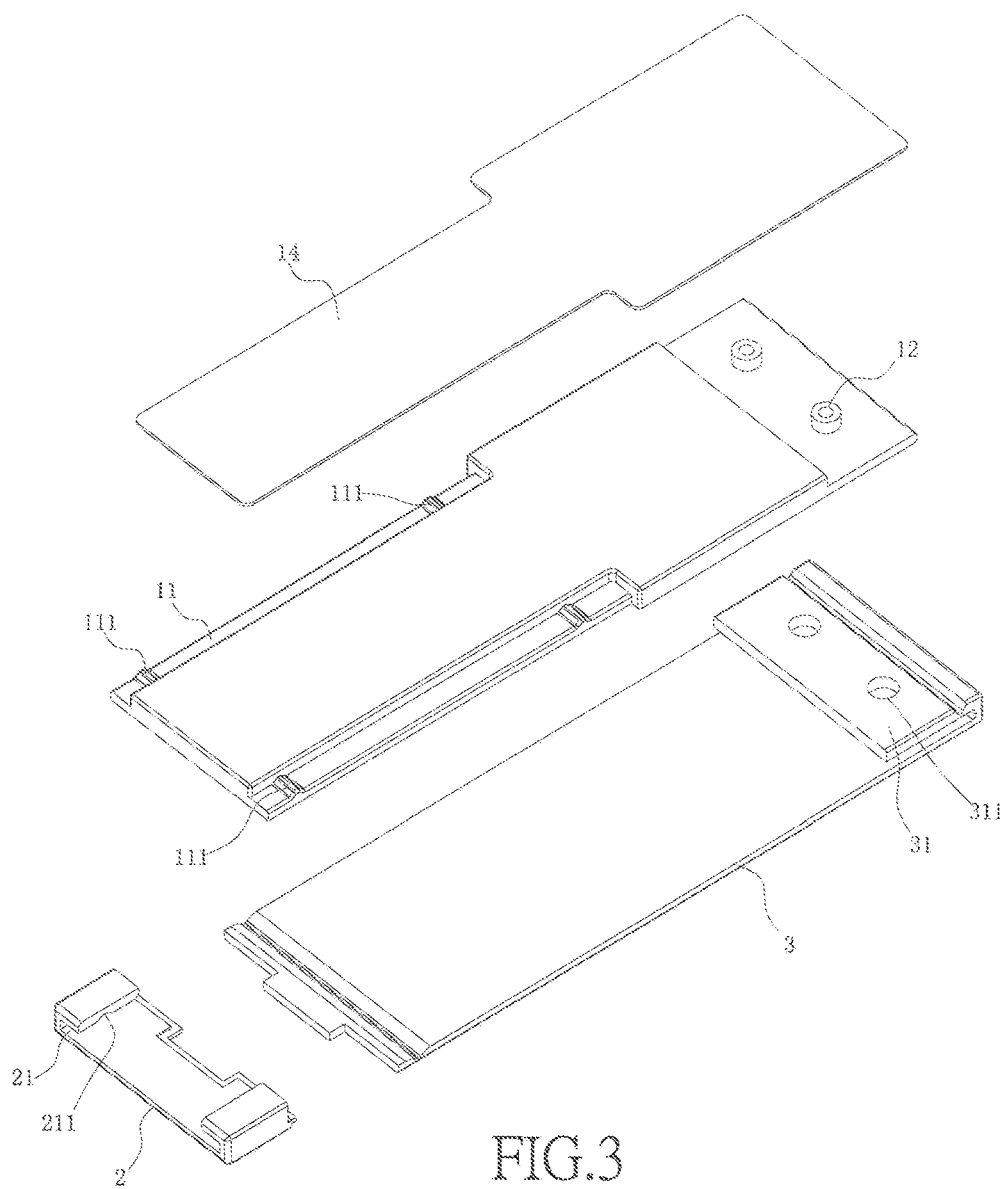
FIG. 3 is a three-dimensional exploded diagram of the present invention.
Figure 4:
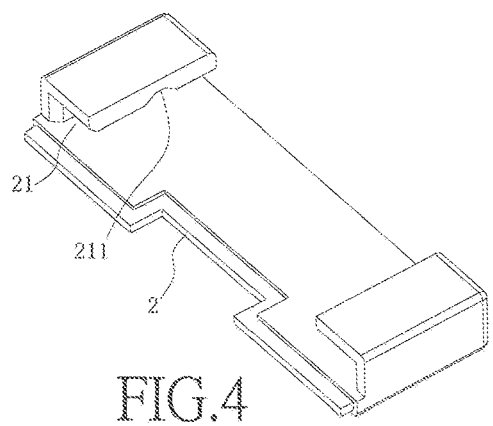
FIG. 4 is a stereogram of the sliding seat in the present invention.
Figure 5:
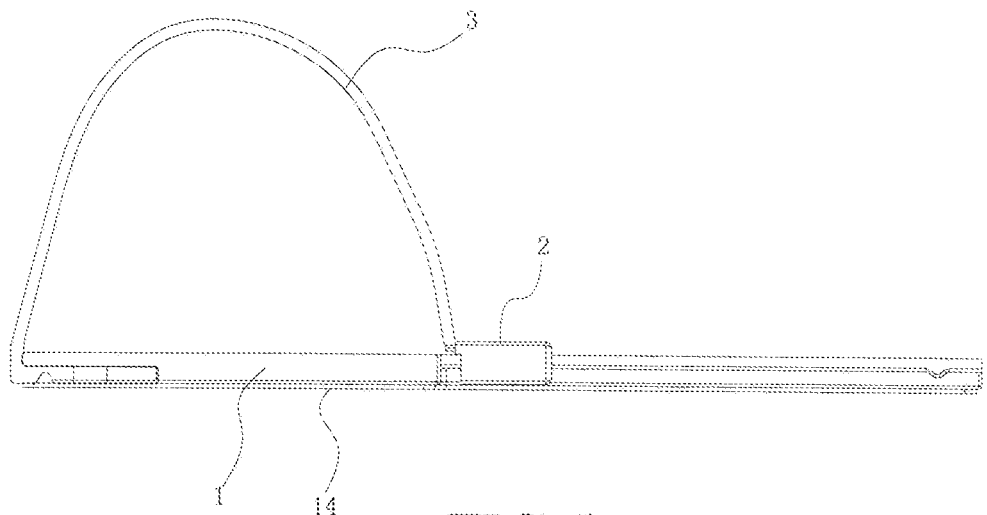
FIG. 5 is a service behavior of the present invention.
Figure 6:
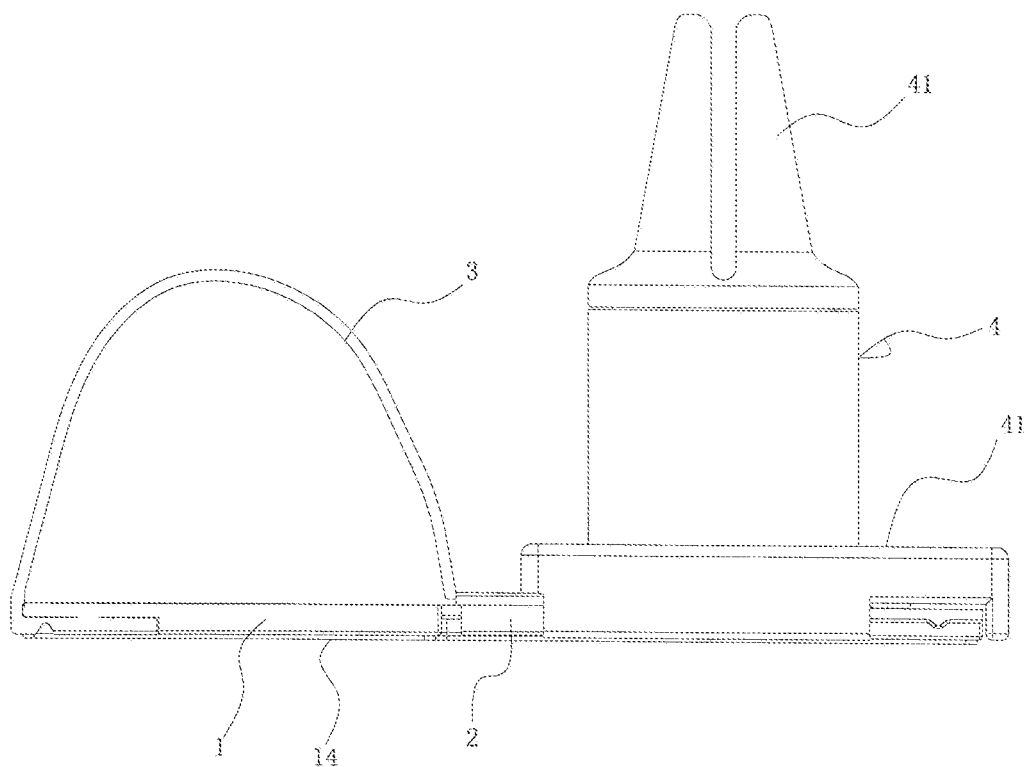
FIG. 6 is a assembly drawing of the present invention and on-board holder.

FIGS. 1-6 show a multifunctional mobile phone holder, which comprises a bottom plate 1 for fixing the back of mobile phone, one end of the bottom plate 1 is provided with a sliding seat 2 which can slide on bottom plate 1, there is a flexible belt 3 between the other end of the bottom plate 1 and sliding seat 2, when the sliding seat 2 slides to one end of bottom plate 1, the flexible belt 3 clings to the face of the bottom plate 1. When the sliding seat 2 slides to the middle of bottom plate 1, the flexible belt 3 rises against the face of the bottom plate 1, forming a ring space 10 for finger to go through. In the use of the present invention, the bottom plate 1 is fixed to the back of mobile phone. When the holder function is not to be used, the sliding seat 2 is slid to one end of bottom plate 1, so that the flexible belt 3 clings to the face of the bottom plate 1 for integrated collection, and it is relatively thin, the use of phone will not be influenced, and the product esthetics is guaranteed. When the holder function is to be used, the sliding seat 2 is slid to the middle of bottom plate 1, the flexible belt 3 rises against the face of the bottom plate 1, forming a ring space 10 for finger to go through. The user's finger goes through the ring space 10, and the flexible belt 3 fastens the finger, so that the user can hold the mobile phone firmly to avoid the phone dropping off. The flexible belt 3 is relatively soft, it will not scratch the finger, and it is comfortable for the finger to wear, convenient to use. The raised flexible belt 3 stands on the table top to support the mobile phone on the table top. In addition, all of the parts in the present invention are nonmetal, the wireless charging function of mobile phone will not be influenced, the use is more convenient, so the present invention has extremely strong marketability.

A first slide rail 11 is formed on both sides of the bottom plate 1. A first slide slot 21 is located in the inner walls on both sides of the sliding seat 2. The first slide slot 21 is fitted over the first slide rail 11, so that the sliding seat 2 is slideable on the bottom plate 1. Wherein a first stopping bulge 111 or a first stopping groove is located in the end and middle of the first slide rail 11. A second stopping groove 211 or a second stopping bulge adapted to the first stopping bulge 111 or the first stopping groove is located in the slot wall of the first slide slot 21 of the sliding seat 2, so that the first stopping bulge 111 or the first stopping groove engages with the second stopping groove 211 or the second stopping bulge when the sliding seat 2 slides to one end of bottom plate 1 or the sliding seat 2 slides to the middle of bottom plate 1, and then the sliding seat 2 can be located at one end of bottom plate 1, or the sliding seat 2 can be located in the middle of bottom plate 1, the flexible belt 3 rises against the face of the bottom plate 1, forming a stable ring space 10.

The surface of the sliding seat 2 is provided with several antislip grooves or antislip bulges 22, so that the sliding seat 2 can be pushed smoothly.

The flexible belt 3 is made of TPU soft gum. The sliding seat 2 is made of PC plastic. Wherein the flexible belt 3 and sliding seat 2 are integrated by double injection. To be specific, the flexible belt 3 and sliding seat 2 have different colors, they are integrated by two-color double injection technique.

A bent portion 31 is formed at the other end of the flexible belt 3 opposite to sliding seat 2. The bent portion 31 is fastened to the back side of the other end of the bottom plate 1 by glue. Wherein several positioning posts 12 are formed on the back side of the other end of the bottom plate 1, the positioning holes 311 in bent portion 31 are fitted over the positioning posts 12.

The back side of the bottom plate 1 is provided with 3M strong adhesive 14. The 3M strong adhesive 14 is used for permanent connection to the back of mobile phone, or for permanent connection to the back of the mobile phone case fitted over the mobile phone.

Figure 7:
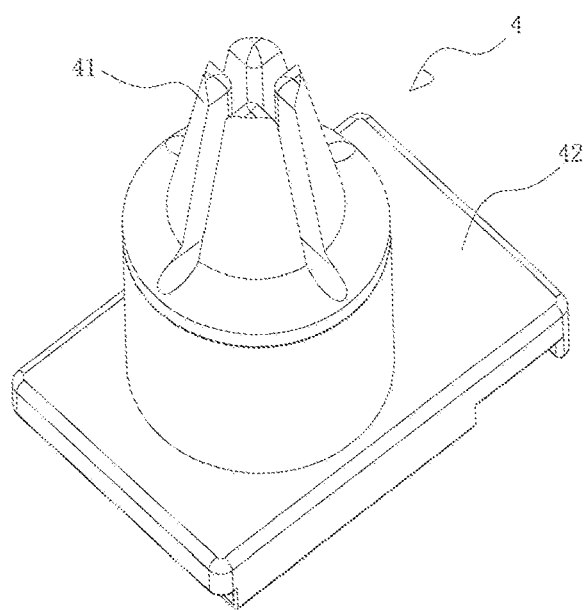
FIG. 7 is a stereogram of on-board holder.
Figure 8:
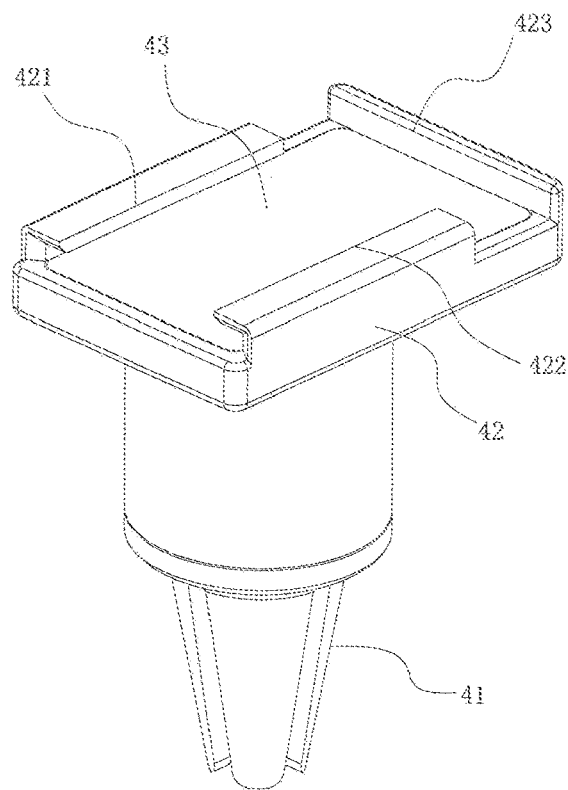
FIG. 8 is a stereogram of on-board holder from another viewing angle.
Figure 9:
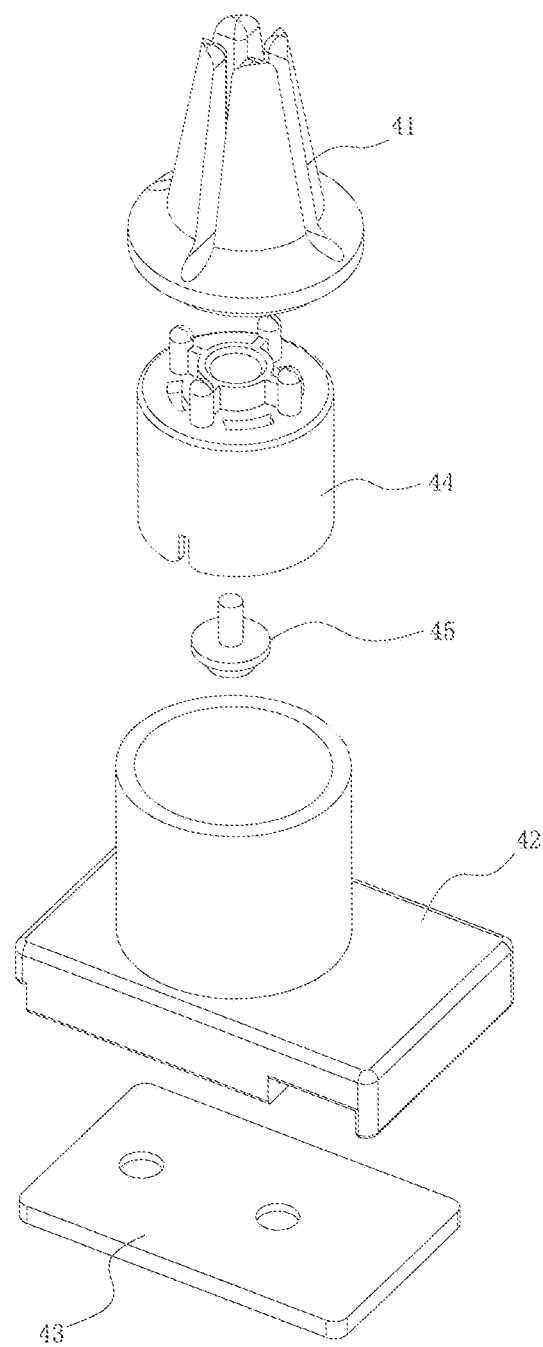
FIG. 9 is a stereogram of on-board holder.

As shown in FIGS. 6-9, when the sliding seat 2 slides to the middle of bottom plate 1, the flexible belt 3 rises against the face of the bottom plate 1 as a support structure, and an on-board holder 4 is fitted over one end of the bottom plate 1. The on-board holder 4 has a locating detent 41 for fastening the automobile air conditioning outlet, so that the present invention can be used together with the on-board holder. When the on-board holder is fastened to the automobile air conditioning outlet, the raised flexible belt 3 contacts the side edge of automobile air conditioning outlet, the flexible belt 3 behaves as an auxiliary support, the present invention is located at the automobile air conditioning outlet stably, it is very convenient to use.

The on-board holder 4 comprises a base 42, a cover plate 43 located at the bottom of the base 42, a rotating cap 44 installed on base 42 and the locating detent 41 which can rotate against the rotating cap 44 installed on rotating cap 44 by truss head screw 45. The base 42 is fitted over one end of the bottom plate 1. The face of the cover plate 43 contacts bottom plate 1. A first clamping portion 421 and a second clamping portion 422 are located on both sides of the bottom of the base 42 respectively. A stopper 423 is formed at one end of the bottom of the base 42. The first clamping portion 421 and the second clamping portion 422 clamp both sides of one end of the bottom plate 1 respectively, and the stopper 423 contacts one end of the bottom plate 1.

To sum up, in the use of the present invention, the bottom plate 1 is fixed to the back of mobile phone. When the holder function is not to be used, the sliding seat 2 is slid to one end of bottom plate 1, so that the flexible belt 3 clings to the face of the bottom plate 1 for integrated collection. It is relatively thin, the use of phone is not influenced, and the product esthetics is guaranteed. When the holder function is to be used, the sliding seat 2 is slid to the middle of bottom plate 1, the flexible belt 3 rises against the face of the bottom plate 1, forming a ring space 10 for the finger to go through. The user's finger goes through the ring space 10, the flexible belt 3 fastens the finger, the user can hold the mobile phone firmly to avoid the phone dropping off. The flexible belt 3 is relatively soft, it will not scratch the finger, it is comfortable and convenient for the finger to wear. The raised flexible belt 3 stands on the table top to support the mobile phone on the table top. In addition, all of the parts in the present invention are nonmetal, the wireless charging function of mobile phone will not be influenced, the use is more convenient, so that the present invention has extremely strong marketability. In addition, the present invention can be used together with on-board holder. When the on-board holder is fastened to the automobile air conditioning outlet, the raised flexible belt 3 contacts the side edge of automobile air conditioning outlet, so that the flexible belt 3 behaves as an auxiliary support, the present invention is located at the automobile air conditioning outlet stably, it is very convenient to use.

I claim:

1. A multifunctional mobile phone holder, comprising:
   a bottom plate (1) for fixedly connecting with a back of a mobile phone; a sliding seat (2) slidable on one end of the bottom plate (1), and a flexible belt (3) another end of the bottom plate connected between another end of the bottom plate (1) and the sliding seat (2);
   when the sliding seat (2) slides to one end of the bottom plate (1), the flexible belt (3) is attached to a surface of the bottom plate (1); when the sliding seat (2) slides to a middle of the bottom plate (1), the flexible belt (3) is raised relative to the surface of the bottom plate (1) and forms a ring space (10) through which a finger passes;
   when the sliding seat (2) slides to the middle of bottom plate (1), the flexible belt (3) rises against the face of the bottom plate (1) as a support structure, and an on-board holder (4) is fitted over one end of the bottom plate (1), the on-board holder (4) has a locating detent (41) for fastening the automobile air conditioning outlet.

2. The multifunctional mobile phone holder according to claim 1, wherein the bottom plate is formed with a first slide rail (11) disposed on both sides thereof; the sliding seat (2) includes a first slide slot (21) disposed on both inner walls; the first slide slot (21) is sleeved with the first slide rail (11), so that the sliding seat (2) is slidably mounted on the bottom plate (1).

3. The multifunctional mobile phone holder according to claim 2, wherein the first slide rail (11) includes a first stopping bulge (111) or a first stopping groove at an end portion and a middle portion thereof; the sliding seat (2) includes a second stopping groove (211) or a second stopping bulge adapted to the first stopping bulge (111) or the first stopping groove at the slot wall of the first slide slot (21).

4. The multifunctional mobile phone holder according to claim 2, wherein the sliding seat (2) includes a plurality of anti-slip grooves or anti-slip bulges (22) on a surface thereof.

5. The multifunctional mobile phone holder according to claim 4, wherein the flexible belt (3) is made of TPU soft gum; the sliding seat (2) is made of PC plastic; the flexible belt (3) and sliding seat (2) are integrated by double injection.

6. The multifunctional mobile phone holder according to claim 5, wherein the flexible belt (3) includes a bent portion (31) opposite to the other end of the sliding seat (2), the bent portion (31) is fastened to a back side of the other end of the bottom plate (1) by glue; the back side of the other end of the bottom plate (1) is formed with a plurality of positioning posts (12), the positioning holes (311) disposed on bent portion (31) are sleeved on the positioning posts (12).

7. The multifunctional mobile phone holder according to claim 2, the back side of the bottom plate (1) includes an adhesive (14).

8. The multifunctional mobile phone holder according to claim 1, wherein the vehicle mount (4) includes a base (42), a cover plate (43) disposed at a bottom of the base (42), a rotating cap (44) mounted on the base (42), and a positioning claw (41) mounted on the rotating cap (44) by a meson screw (45) and rotatable relative to the rotating cap (44); the base (42) is sleeved and fixed to one end of the bottom plate (1), a surface of the cover plate (43) is in contact with the bottom plate (1).

9. The multifunctional mobile phone holder according to claim 8, wherein the base includes a first clamping portion (421) and a second clamping portion (422) are respectively disposed on both sides thereof; a stopper (423) being formed at one end of the bottom portion of the base (42) and the first clamping portion (421) and the second clamping portion (422) are respectively clamped and fixed to both sides of one end of the bottom plate (1), and the stopper (423) is in contact with one end of the bottom plate (1).

\* \* \* \* \*